(12) United States Patent
Ohashi et al.

(10) Patent No.: US 12,054,247 B2
(45) Date of Patent: Aug. 6, 2024

(54) MOTOR INTEGRATED TYPE FLUID MACHINE, VERTICAL TAKE-OFF AND LANDING AIRCRAFT, AND DESIGN METHOD FOR MOTOR INTEGRATED TYPE FLUID MACHINE

(71) Applicant: MITSUBISHI HEAVY INDUSTRIES, LTD., Tokyo (JP)

(72) Inventors: Kazuki Ohashi, Tokyo (JP); Naoaki Fujiwara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 119 days.

(21) Appl. No.: 17/789,157

(22) PCT Filed: Sep. 28, 2020

(86) PCT No.: PCT/JP2020/036523
§ 371 (c)(1),
(2) Date: Jun. 24, 2022

(87) PCT Pub. No.: WO2021/131196
PCT Pub. Date: Jul. 1, 2021

(65) Prior Publication Data
US 2023/0048852 A1    Feb. 16, 2023

(30) Foreign Application Priority Data
Dec. 27, 2019 (JP) ................. 2019-238689

(51) Int. Cl.
*B64C 27/20* (2023.01)
*B64C 29/00* (2006.01)
(Continued)

(52) U.S. Cl.
CPC .......... *B64C 27/20* (2013.01); *B64C 29/0008* (2013.01); *B64D 27/02* (2013.01);
(Continued)

(58) Field of Classification Search
CPC ..... B64C 27/20; B64C 29/0008; B64C 1/061; B64D 27/02; B64F 5/00; H02K 21/14; B64U 30/26; B64U 50/14
See application file for complete search history.

(56) References Cited

U.S. PATENT DOCUMENTS 11,506,178 B2 * 11/2022 Marcel ................ H02K 7/1823
2009/0121073 A1   5/2009 Doane et al.
(Continued)

FOREIGN PATENT DOCUMENTS

EP    3162702 A2    5/2017
JP    2001097288 A   4/2001
(Continued)

OTHER PUBLICATIONS

International Search Report and Written Opinion of International Application No. PCT/JP2020/036523 mailed Dec. 8, 2020; 8pp.
(Continued)

*Primary Examiner* — Rodney A Bonnette
(74) *Attorney, Agent, or Firm* — HAUPTMAN HAM, LLP

(57) ABSTRACT

A motor integrated type fluid machine suctions a fluid from a suction port and discharges the suctioned fluid from a discharge outlet. The machine includes: a shaft portion provided at a center of a rotation axis; a rotating portion rotating around the shaft portion; an outer peripheral portion provided on an outer periphery of the shaft portion; and an outer peripheral drive motor rotating the rotating portion. The rotating portion includes a hub rotatably supported by the shaft portion, blades provided on an outer peripheral side of the hub and provided side by side in a circumferential direction of the rotation axis, and a rotating outer peripheral portion having an annular shape along the circumferential direction. A ratio of a rigidity of the rotating outer peripheral
(Continued)

portion against a centrifugal force to a rigidity of the rotating portion against the centrifugal force is 50% to 95%.

7 Claims, 4 Drawing Sheets

(51) Int. Cl.
    *B64D 27/02*     (2006.01)
    *B64F 5/00*     (2017.01)
    *H02K 21/14*     (2006.01)
    *B64C 1/06*     (2006.01)

(52) U.S. Cl.
    CPC ............... *B64F 5/00* (2013.01); *H02K 21/14* (2013.01); *B64C 1/061* (2013.01)

(56) References Cited

U.S. PATENT DOCUMENTS

| | | |
|---|---|---|
| 2010/0133853 A1 | 6/2010 | Masi et al. |
| 2017/0104385 A1 | 4/2017 | Salamon et al. |
| 2020/0140102 A1* | 5/2020 | Marcel .................... B64D 27/24 |
| 2021/0323688 A1* | 10/2021 | Yajima ................... B64D 33/04 |
| 2022/0063820 A1* | 3/2022 | Uruma .................... B64C 29/00 |
| 2022/0161937 A1* | 5/2022 | Fujiwara ................ H02K 7/006 |
| 2022/0388686 A1* | 12/2022 | Ohashi .................... H02K 7/14 |

FOREIGN PATENT DOCUMENTS

| | | |
|---|---|---|
| JP | 2013024057 A | 2/2013 |
| JP | 2017109726 A | 6/2017 |
| JP | 2017199724 A1 | 12/2018 |
| WO | 2017199724 A1 | 11/2017 |
| WO | 2017199724 A1 | 12/2018 |

OTHER PUBLICATIONS

Extended European Search Report of European Application No. 20905784.3 mailed Dec. 2, 2022; 10pp.

* cited by examiner

MOTOR INTEGRATED TYPE FLUID MACHINE, VERTICAL TAKE-OFF AND LANDING AIRCRAFT, AND DESIGN METHOD FOR MOTOR INTEGRATED TYPE FLUID MACHINE

RELATED APPLICATIONS

The present application is a National Phase of International Application Number PCT/JP2020/036523 filed Sep. 28, 2020 and claims priority to Japanese application Number 2019-238689 filed Dec. 27, 2019.

TECHNICAL FIELD

The present disclosure relates to a motor integrated type fluid machine, a vertical take-off and landing aircraft, and a design method for a motor integrated type fluid machine.

BACKGROUND ART

In the related art, there is known a ring motor including a stator, a rotor, and a plurality of propeller blades (for example, refer to PTL 1). The stator includes a stator support ring, and a plurality of windings that are disposed in a circumferential direction of the stator support ring. A plurality of pitch blades are joined to the stator support ring. The rotor includes a rotor support ring, a plurality of magnetic poles disposed in a circumferential direction of the rotor support ring, and a central hub. The central hub is joined to a portion of the stator. The plurality of propeller blades are joined to the rotor support ring. For this reason, by virtue of the windings and the magnetic poles, the rotor rotates around the central hub joined to the stator, so that the plurality of propeller blades rotate.

CITATION LIST

Patent Literature

[PTL 1] Japanese Unexamined Patent Application Publication No. 2017-109726

SUMMARY OF INVENTION

Technical Problem

Meanwhile, in the case of a motor integrated type fluid machine such as the ring motor of PTL 1, a centrifugal force acts on the rotor support ring when blades are rotated. At this time, since the plurality of magnetic poles are arranged in the circumferential direction on the rotor support ring, a larger centrifugal force acts on each blade due to the mass of the magnetic poles. In this case, the thickness of each blade is increased in order to secure the load capacity of each blade against the centrifugal force, which causes an increase in weight of the motor integrated type fluid machine. In other words, it is difficult to secure the load capacity of each blade against the centrifugal force while suppressing an increase in weight of the motor integrated type fluid machine.

Therefore, an object of the present disclosure is to provide a motor integrated type fluid machine, a vertical take-off and landing aircraft, and a design method for a motor integrated type fluid machine with which it is possible to suitably secure a load capacity against a centrifugal force while suppressing an increase in weight.

Solution to Problem

According to an aspect of the present disclosure, there is provided a motor integrated type fluid machine that suctions a fluid from a suction port and discharges the suctioned fluid from a discharge outlet, the machine including: a shaft portion that is provided at a center of a rotation axis; a rotating portion that rotates around the shaft portion; an outer peripheral portion that is provided on an outer periphery of the shaft portion; and a motor that rotates the rotating portion. The motor is an outer peripheral drive motor that applies power from the outer peripheral portion to rotate the rotating portion. The rotating portion includes a hub that is rotatably supported by the shaft portion, a plurality of blades that are provided on an outer peripheral side of the hub and provided side by side in a circumferential direction of the rotation axis, and a rotating outer peripheral portion that is provided on an outer peripheral side of the plurality of blades and has an annular shape along the circumferential direction of the rotation axis. The motor includes a rotor side magnet that is provided in the rotating outer peripheral portion, and a stator side magnet that is provided in the outer peripheral portion to face the rotor side magnet. A ratio of a rigidity of the rotating outer peripheral portion against a centrifugal force to a rigidity of the rotating portion against the centrifugal force is equal to or larger than 50% and equal to or smaller than 95%.

According to another aspect of the present disclosure, there is provided a vertical take-off and landing aircraft including: the motor integrated type fluid machine; and an airframe that is moved by thrust generated from the motor integrated type fluid machine.

According to still another aspect of the present disclosure, there is provided a design method for the motor integrated type fluid machine, the method including: a step of setting the ratio of the rigidity of the rotating outer peripheral portion to the rigidity of the rotating portion; a step of deriving a centrifugal force borne by the plurality of blades based on the ratio between the rigidities; a step of deriving a thickness of the blades based on the derived centrifugal force such that a rigidity, at which the blades withstand the derived centrifugal force, is achieved; and a step of deriving a plate thickness of the rotating outer peripheral portion based on the ratio between the rigidities and the rigidity of the blades such that a rigidity at which the rotating outer peripheral portion withstands a centrifugal force is achieved.

Advantageous Effects of Invention

According to the aspects of the present disclosure, it is possible to suitably secure a load capacity against a centrifugal force while suppressing an increase in weight.

DESCRIPTION OF EMBODIMENTS

Hereinafter, an embodiment according to the present disclosure will be described in detail with reference to the drawings. Incidentally, the invention is not limited by the embodiment. In addition, the components in the following embodiment include components that can be easily replaced by those skilled in the art, or components that are substantially the same. Further, the components to be described below can be appropriately combined, and when there are a plurality of embodiments, the embodiments can be combined.

EMBODIMENT

A motor integrated type fluid machine according to the present embodiment is an axial fluid machine. The motor integrated type fluid machine is a motor integrated type fan 1 (hereinafter, also simply referred to as a fan 1) that takes in air from a suction port and discharges the air from a discharge outlet, thus to generate thrust. Incidentally, in the present embodiment, the motor integrated type fan 1 will be described as an application of the motor integrated type fluid machine, and the motor integrated type fluid machine is not particularly limited to the configuration. The motor integrated type fluid machine may be applied, for example, as a motor integrated type thruster such as a propeller which takes in a liquid such as water or seawater from a suction port to inject the liquid from a discharge outlet, thus to generate thrust.

(Motor Integrated Type Fan)

The motor integrated type fan 1 is provided in, for example, a vertical take-off and landing aircraft such as a helicopter or a drone. The motor integrated type fan 1 provided in the vertical take-off and landing aircraft generates thrust for lifting an airframe, or generates thrust for controlling the posture of the airframe. Incidentally, the motor integrated type fan 1 may be applied to, for example, an air cushion vehicle such as a hovercraft. Further, when the motor integrated type fan 1 is applied as a motor integrated type thruster, the motor integrated type fan 1 may be applied to ships.

Figure 1:
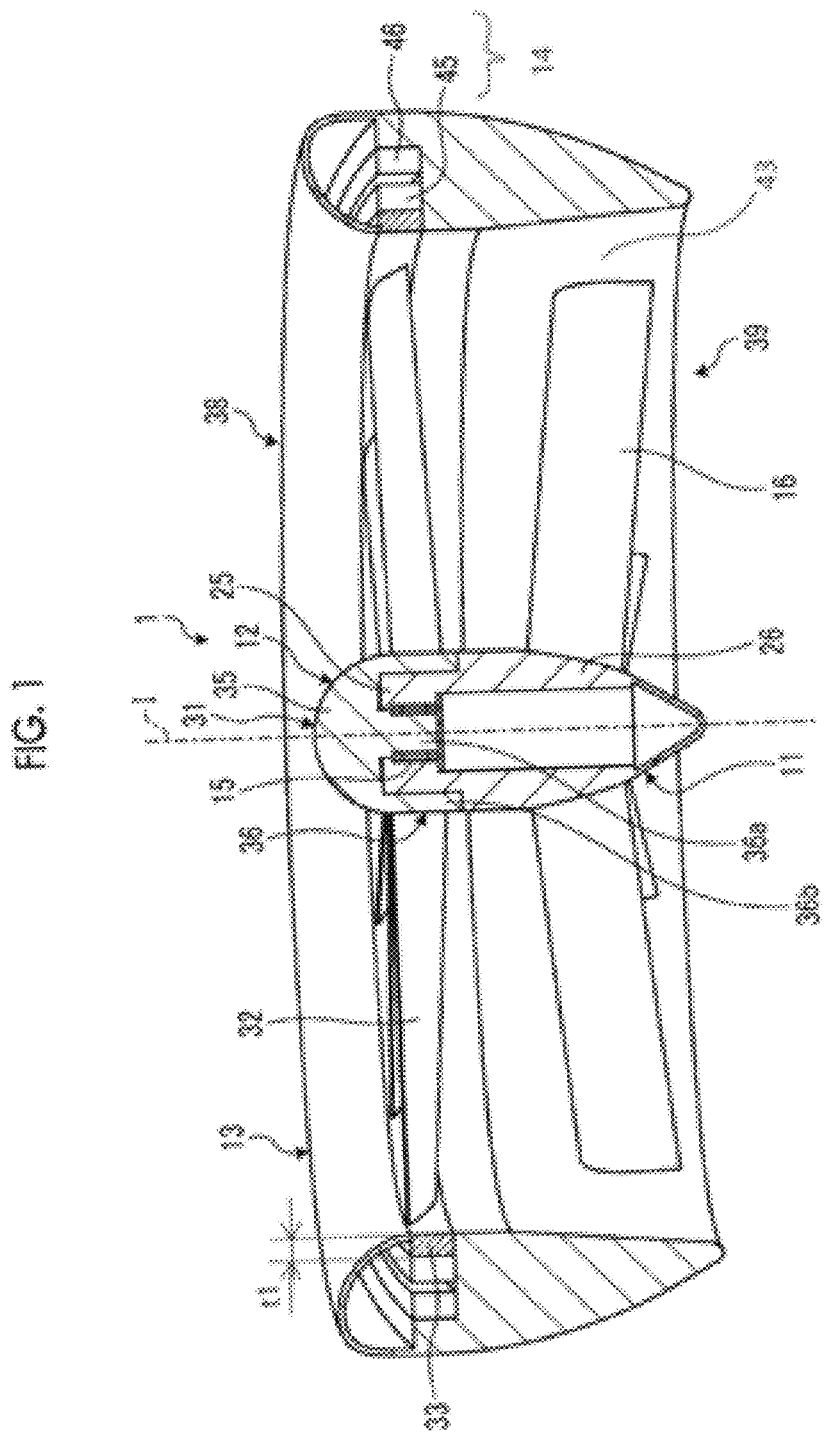
FIG. 1 is a cross-sectional view of a motor integrated type fan according to an embodiment.
Figure 2:
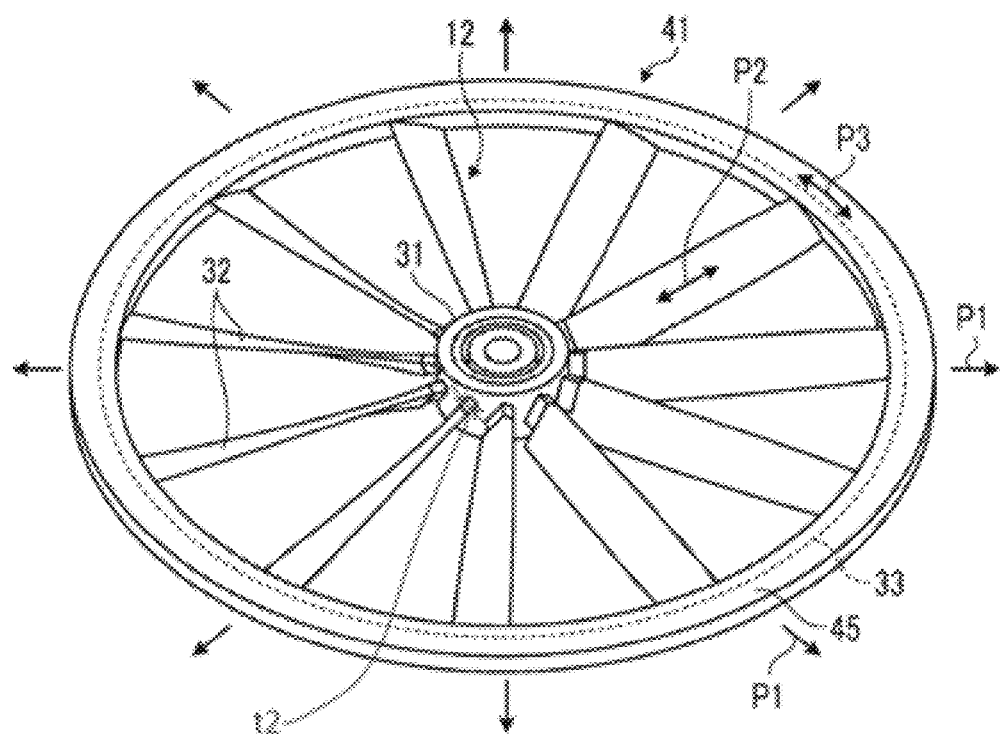
FIG. 2 is a perspective view of a fan blade according to the present embodiment.
Figure 3:
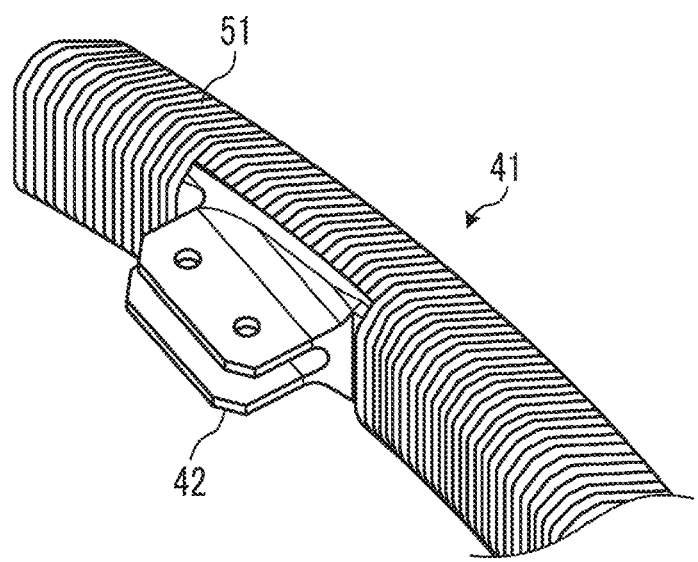
FIG. 3 is a partial perspective view showing a part of the fan blade according to the present embodiment.
Figure 4:
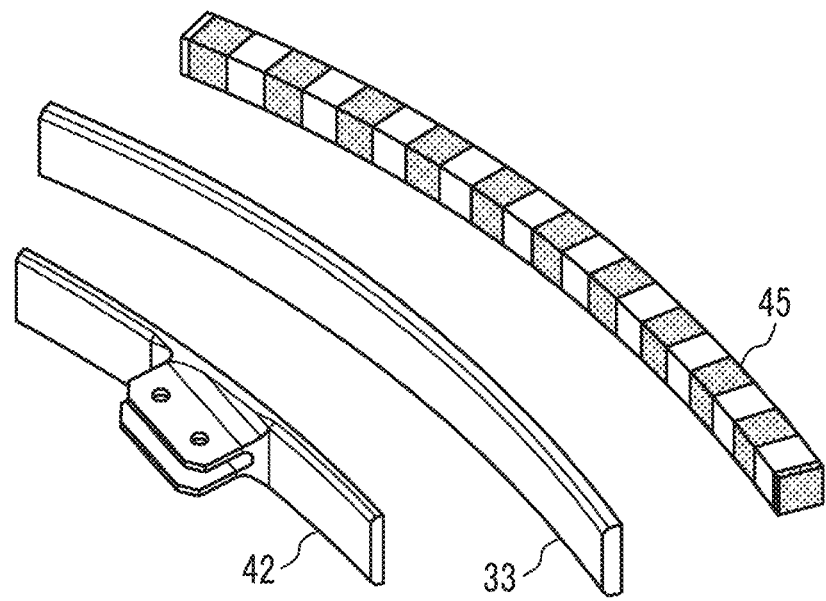
FIG. 4 is a description view showing a part of the fan blade according to the present embodiment.
Figure 5:
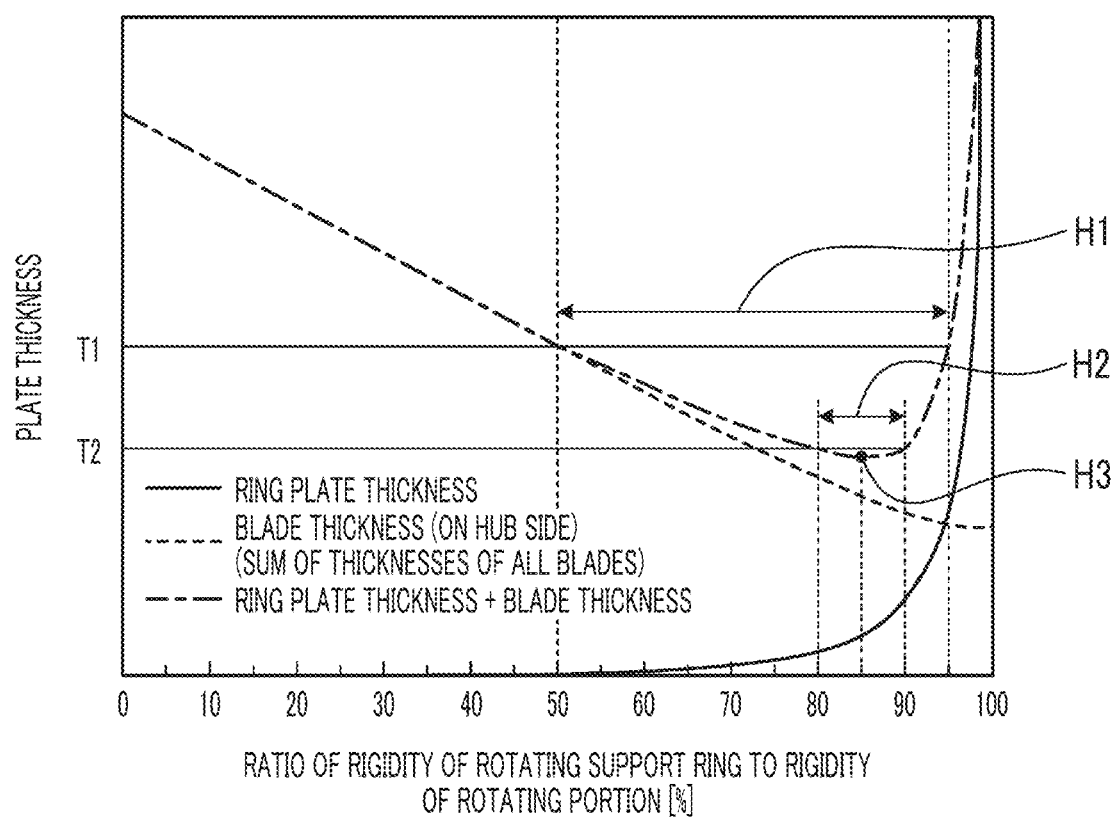
FIG. 5 is a graph showing the relationship between a plate thickness and the ratio of the rigidity of a rotating support ring.

The motor integrated type fan 1 will be described with reference to FIGS. 1 to 5. FIG. 1 is a cross-sectional view of a motor integrated type fan according to the present embodiment. FIG. 2 is a perspective view of a fan blade according to the present embodiment. FIG. 3 is a partial perspective view showing a part of the fan blade according to the present embodiment. FIG. 4 is a description view showing a part of the fan blade according to the present embodiment. FIG. 5 is a graph showing the relationship between a plate thickness and the ratio of the rigidity of a rotating support ring.

The motor integrated type fan 1 is called a duct-type propeller or a duct fan. The motor integrated type fan 1 is used, for example, in a horizontal state in which an axial direction thereof is parallel to a vertical direction, and takes in air from an upper side in the vertical direction and discharges the air to a lower side in the vertical direction. Incidentally, the motor integrated type fan 1 may be used in a vertical state in which the axial direction is parallel to a horizontal direction.

The motor integrated type fan 1 is a flat fan of which the length in an axial direction of a rotation axis I is shorter than the length in a radial direction of the rotation axis I. The motor integrated type fan 1 is a fan in which one motor is integrally provided, and includes a shaft portion 11, a rotating portion 12, an outer peripheral portion 13, a motor 14, a rolling bearing 15, and a guide vane 16.

The shaft portion 11 is provided at the center of the rotation axis I, and is a support system (fixed side). The axial direction of the rotation axis I is an upward and downward direction in FIG. 1, and is a direction along the vertical direction. For this reason, a flow direction of air is a direction along the axial direction of the rotation axis I, and the air flows from an upper side toward a lower side in FIG. 1. The shaft portion 11 includes a shaft side fitting portion 25 that is a portion provided on an upstream side in the axial direction of the rotation axis I, and a shaft body 26 that is a portion provided downstream of the shaft side fitting portion 25.

A hub 31 of the rotating portion 12 to be described later is fitted to the shaft side fitting portion 25. The shaft side fitting portion 25 has a cylindrical shape, and is provided to protrude from an end surface on the upstream side of the shaft body 26 in the axial direction. A space having a columnar shape is formed on a center side of the rotation axis I in the shaft side fitting portion 25. A part of the hub 31 of the rotating portion 12 is inserted into the space. In addition, an outer peripheral side of the shaft side fitting portion 25 is surrounded by a part of the hub 31 of the rotating portion 12.

The shaft body 26 has a substantially conical shape that is tapered from the upstream side toward a downstream side in the axial direction. For this reason, an outer peripheral surface of the shaft body 26 is a surface that approaches an inner side from an outer side in the radial direction as the surface extends from the upstream side toward the downstream side in the axial direction. An internal space in which a device can be installed is formed inside the shaft body 26. Examples of the device include a control device, a camera and the like. In addition, an end portion on the radial inner side of the guide vane 16 to be described later is connected to the outer peripheral surface of the shaft body 26.

As illustrated in FIGS. 1 and 2, the rotating portion 12 is a rotating system (rotating side) that rotates around the shaft portion 11. The rotating portion 12 is provided on an inlet side, into which air flows, with respect to the shaft portion 11 in the axial direction of the rotation axis I. The rotating portion 12 includes the hub 31, a plurality of blades 32, and a rotating support ring 33.

The hub 31 is provided upstream of the shaft portion 11 in the axial direction, and is rotatably fitted to the shaft side fitting portion 25. The hub 31 includes a hub body 35 that is a portion provided on the upstream side in the axial direction, and a hub side fitting portion 36 that is a portion provided downstream of the hub body 35. The hub body 35 is formed such that an end surface on the upstream side is a hemispherical surface having a predetermined radius of curvature. The hub side fitting portion 36 has a shape complementary to that of the shaft side fitting portion 25. The hub side fitting portion 36 includes a central shaft 36a provided at the center of the rotation axis, and a cylindrical portion 36b that has a cylindrical shape and is provided on an outer peripheral side of the central shaft 36a. The central shaft 36a is inserted into the space of the shaft side fitting portion 25, the space being formed at the center of the rotation axis. The cylindrical portion 36b is provided to protrude from an end surface on the downstream side of the hub body 35 in the axial direction. The cylindrical portion 36b is disposed to surround an outer periphery of the shaft side fitting portion 25. At this time, the rolling bearing 15 is provided between an inner peripheral surface of the shaft side fitting portion 25 and an outer peripheral surface of the central shaft 36a of the hub 31.

Then, a surface extending from an end surface of the hub body 35 to the outer peripheral surface of the shaft body 26 via an outer peripheral surface of the cylindrical portion 36b is a surface that is smooth without a step.

The plurality of blades 32 are provided to extend from the hub 31 toward the radial outer side, and are provided side by side at predetermined intervals in a circumferential direction. Each of the blades 32 has an airfoil shape and the length thereof in a direction in which a pressure surface and a suction surface face each other is the thickness thereof. The plurality of blades 32 are made of a composite material. Incidentally, in the present embodiment, the plurality of blades 32 are made of a composite material; however, the material is not particularly limited, and the plurality of blades 32 may be made of, for example, a metallic material.

The rotating support ring 33 is formed in an annular shape centered on the rotation axis I. The rotating support ring 33 is connected to an outer peripheral side of the plurality of blades 32 in the radial direction of the rotation axis I. A radial outer end portion of each blade 32 is fixed to an inner peripheral surface of the rotating support ring 33 via a joining fitting 42. In addition, a permanent magnet 45 of the motor 14 to be described later is held at the outer peripheral surface of the rotating support ring 33.

The rotating portion 12 is configured such that the hub 31, the plurality of blades 32, and the rotating support ring 33 are integrally joined to each other, and rotates around the hub 31. In addition, as will be described in detail later, the permanent magnet 45 of the motor 14 is integrally held at the rotating portion 12, so that a fan blade rotor 41 in which the rotating portion 12 and the permanent magnet 45 are integrated with each other as shown in FIG. 2 is formed.

The outer peripheral portion 13 is provided outside the shaft portion 11 in the radial direction, and is the support system (fixed side). The outer peripheral portion 13 is a duct that is formed in an annular shape, and is caused to generate thrust by the rotation of the rotating portion 12. In the outer peripheral portion 13 (hereinafter, referred to as the duct 13), an opening on the upstream side in the axial direction of the rotation axis I is a suction port 38, and an opening on the downstream side is a discharge outlet 39. In addition, the duct 13 has a shape in which when the rotating portion 12 rotates, air is suctioned from the suction port 38, and the suctioned air is discharged from the discharge outlet 39 to generate thrust. Specifically, an inner peripheral surface of the duct 13 on the downstream side of the rotating portion 12 is a surface that is widened from the suction port 38 side toward the discharge outlet 39 side.

An internal space, which has an annular shape and accommodates the rotating support ring 33 of the rotating portion 12, the permanent magnet 45 of the motor 14, and a coil 46 of the motor 14 to be described later, is formed inside the duct 13. The duct 13 holds the coil 46 thereinside and the permanent magnet 45 and the coil 46 face each other in the radial direction, the coil 46 being provided at a position facing the permanent magnet 45 held by the rotating portion 12. Namely, the duct 13 functions as a stator.

The motor 14 is an outer peripheral drive motor that applies power from a duct 13 side toward the rotating portion 12 to cause the rotating portion 12 to rotate. The motor 14 includes a rotor side magnet provided on a rotating portion 12 side, and a stator side magnet provided on the duct 13 side. In the present embodiment, the rotor side magnet is the permanent magnet 45, and the stator side magnet is the coil 46 which is an electromagnet.

The permanent magnet 45 is provided to be held at the outer peripheral surface of the rotating support ring 33, and is disposed in an annular shape in the circumferential direction. In addition, the permanent magnet 45 is configured such that positive poles and negative poles alternate at predetermined intervals in the circumferential direction. Incidentally, the permanent magnet 45 may be in a Halbach array. The permanent magnet 45 is provided at a position facing the coil 46 in the radial direction of the rotation axis I.

A plurality of the coils 46 are provided to be held inside the duct 13 and to face the poles of the permanent magnet 45 and are provided side by side in the circumferential direction. The coil 46 is provided at a position facing the permanent magnet 45, which is held by the rotating portion 12, in the radial direction of the rotation axis I. Namely, the permanent magnet 45 and the coil 46 are disposed to face each other in the radial direction of the rotation axis I, which is a radial disposition.

The rolling bearing 15 is provided between the inner peripheral surface of the shaft side fitting portion 25 of the shaft portion 11 and the outer peripheral surface of the central shaft 36a of the hub 31 of the rotating portion 12. The rolling bearing 15 connects the shaft portion 11 and the rotating portion 12 while allowing the rotating portion 12 to rotate with respect to the shaft portion 11. The rolling bearing 15 is, for example, a ball bearing or the like.

The guide vane 16 is provided to connect the shaft portion 11 and the duct 13. The guide vane 16 is provided downstream of the rotating portion 12 in the axial direction of the rotation axis I. Namely, the guide vane 16 is provided at the position of a downstream portion 43 of the duct 13 in the axial direction. A plurality of the guide vanes 16 are provided side by side in the circumferential direction of the rotation axis I. In addition, the guide vane 16 has a streamlined shape such as an airfoil shape, and rectifies air, which flows from the rotating portion 12, to generate thrust. Incidentally, the shape of the guide vane 16 is not limited to an airfoil shape, and may be a plate shape.

In the motor integrated type fan 1 described above, power generated by a magnetic field is applied from the duct 13 side to the rotating portion 12 by the motor 14, so that the rotating portion 12 rotates. When the rotating portion 12 rotates, the motor integrated type fan 1 suctions air from the suction port 38, and discharges the air toward the discharge outlet 39. The air discharged from the rotating portion 12 flows along the inner peripheral surface of the duct 13 to generate thrust. At this time, the flow of the air is rectified by the guide vanes 16, so that thrust is also generated by the guide vanes 16.

(Fan Blade Rotor)

Next, with reference to FIGS. 2 to 4, the fan blade rotor 41 in which the rotating portion 12 and the permanent magnet 45 are integrated with each other will be described. The fan blade rotor 41 includes the rotating portion 12, the permanent magnet 45, and a restraining portion 51.

For example, a composite material is used for the restraining portion 51, and the restraining portion 51 is wound around the rotating support ring 33 and the permanent magnet 45 from the outside of the rotating support ring 33 of the rotating portion 12 and the permanent magnet 45. As the composite material, a composite material obtained by causing a resin to infiltrate carbon fiber (for example, a composite material obtained by curing a prepreg) is applied. Further, the composite material may be a sheet-like narrow composite material or a fiber bundle, and is not particularly limited.

As shown in FIG. 3, the restraining portion 51 is wound around the rotating support ring 33 extending in the circumferential direction and the permanent magnet 45 in a spiral shape and integrally cured to integrally restrain the rotating support ring 33 and the permanent magnet 45, the rotating support ring 33 and the permanent magnet 45 serving as a core. In addition, as shown in FIG. 4, the joining fitting 42 that is joined to a radial outer end portion of each of the blades 32 is provided on an inner peripheral side of the rotating support ring 33 and the restraining portion 51 integrally restrains the rotating support ring 33, the permanent magnet 45, and the joining fitting 42.

In addition, the restraining portion 51 is wound around the entire circumference of the rotating support ring 33. At this time, the restraining portion 51 is wound such that portions thereof overlap with each other in the circumferential direction of the rotating support ring 33. Namely, regarding the restraining portion 51 spirally wound in the circumferential direction, one portion of the restraining portion 51 and the other portion of the restraining portion 51, which are adjacent to each other in the circumferential direction, overlap with each other.

Incidentally, as shown in FIG. 3, it is difficult for the restraining portion 51 to integrally restrain the rotating support ring 33, the permanent magnet 45, and the joining fitting 42 at a joining part which is at the center of the joining fitting 42 in the circumferential direction. In this case, the restraining portion 51 integrally restrains portions of the rotating support ring 33 and the permanent magnet 45 that correspond to the joining part of the joining fitting 42. Then, the restraining portion 51 integrally restrains the rotating support ring 33, the permanent magnet 45, and the joining fitting 42 at flat plate portions of the joining fitting 42, which are on both sides in the circumferential direction. Namely, the restraining portion 51 may be configured to be divided into a plurality of parts and a configuration in which a restraining portion 51 that restrains the rotating support ring 33 and the permanent magnet 45 at the joining part of the joining fitting 42 and a restraining portion 51 that restrains the rotating support ring 33, the permanent magnet 45, and the joining fitting 42 at the flat plate portions of the joining fitting 42 are included may also be adopted. In this case, it is preferable to use the same composite material for the divided restraining portions 51.

When the fan blade rotor 41 as described above rotates, a centrifugal force P1 is applied to the fan blade rotor 41. The centrifugal force P1 is distributed to each blade 32 of the fan blade rotor 41 and the rotating support ring 33, so that a tensile force P2 in the radial direction acts on each blade 32 of the fan blade rotor 41 and a hoop stress P3 in the circumferential direction acts on the rotating support ring 33 of the fan blade rotor 41.

Here, the rigidity of the rotating support ring 33 with respect to the centrifugal force P1 is defined as how the rotating support ring 33 is difficult to be elongated in the radial direction by the centrifugal force P1 and is a value obtained by dividing the centrifugal force P1 by the degree of elongation in the radial direction. Similarly, the rigidity of the rotating portion 12 with respect to the centrifugal force P1 is defined as how the rotating portion 12 is difficult to be elongated in the radial direction by the centrifugal force P1 and is a value obtained by dividing the centrifugal force P1 by the degree of elongation in the radial direction. The rotating support ring 33 is elongated in the radial direction when the rotating support ring 33 receives the centrifugal force P1. Similarly, the blades 32 are elongated in the radial direction when the blades 32 receive the centrifugal force P1. Since the end portions of the blades 32 are joined to the rotating support ring 33 via the joining fitting 42, the rotating support ring 33 and the blades 32 are the same as each other in degree of elongation in the radial direction. At this time, the centrifugal force P1 is distributed into the tensile force P2 and the hoop stress P3 in accordance with the ratio between the rigidity of the plurality of blades 32 and the rigidity of the rotating support ring 33 such that the degree of elongation of the rotating support ring 33 and the degree of elongation of the blades 32 are balanced. Specifically, in a case where the ratio of the rigidity of the rotating support ring 33 is large, the rotating support ring 33 is difficult to be elongated in the radial direction. For example, when the thickness t2 of each blades 32 is made small and the thickness t1 of the rotating support ring 33 in the radial direction is made large, the centrifugal force P1 distributed to the plurality of blades 32 (that is, the tensile force P2) is made small and the centrifugal force P1 distributed to the rotating support ring 33 (that is, the hoop stress P3) is made large. On the other hand, in a case where the ratio of the rigidity of the rotating support ring 33 is small, the rotating support ring 33 is easily elongated in the radial direction. For example, when the thickness t2 of each blades 32 is made large and the thickness t1 of the rotating support ring 33 in the radial direction is made small, the centrifugal force P1 distributed to the plurality of blades 32 (that is, the tensile force P2) is made large and the centrifugal force P1 distributed to the rotating support ring 33 (that is, the hoop stress P3) is made small. As described above, the thickness t2 of each blade 32 and the thickness t1 of the rotating support ring 33 in the radial direction are in a trade-off relationship and the ratio between the rigidity of the plurality of blades 32 and the rigidity of the rotating support ring 33 is set as follows in consideration of the relationship.

(Relationship Between Ratio Between Rigidities and Plate Thickness)

In FIG. 5, the horizontal axis corresponds to the ratio of the rigidity of the rotating support ring 33 to the rigidity of the rotating portion 12 and the vertical axis corresponds to plate thicknesses. Incidentally, the plate thicknesses include the thickness t1 of the rotating support ring 33 in the radial direction (ring plate thickness: solid line), the thickness t2 of the blades 32 (blade thickness: dotted line), and the ring plate thickness+the blade thickness (dashed line). In addition, in the graph of FIG. 5, a thickness on a hub 31 side of the blades 32 is adopted as the thickness t2 of the blades 32 and the thickness t2 of the blades 32 is the sum of the thicknesses t2 of all blades 32. The blade thickness is a value obtained by calculating a thickness required to bear a force borne by the blades 32. In addition, the ring plate thickness is a value obtained by calculating a plate thickness required to achieve a desired rigidity ratio with respect to the rigidity of the blades 32.

Figure 6:
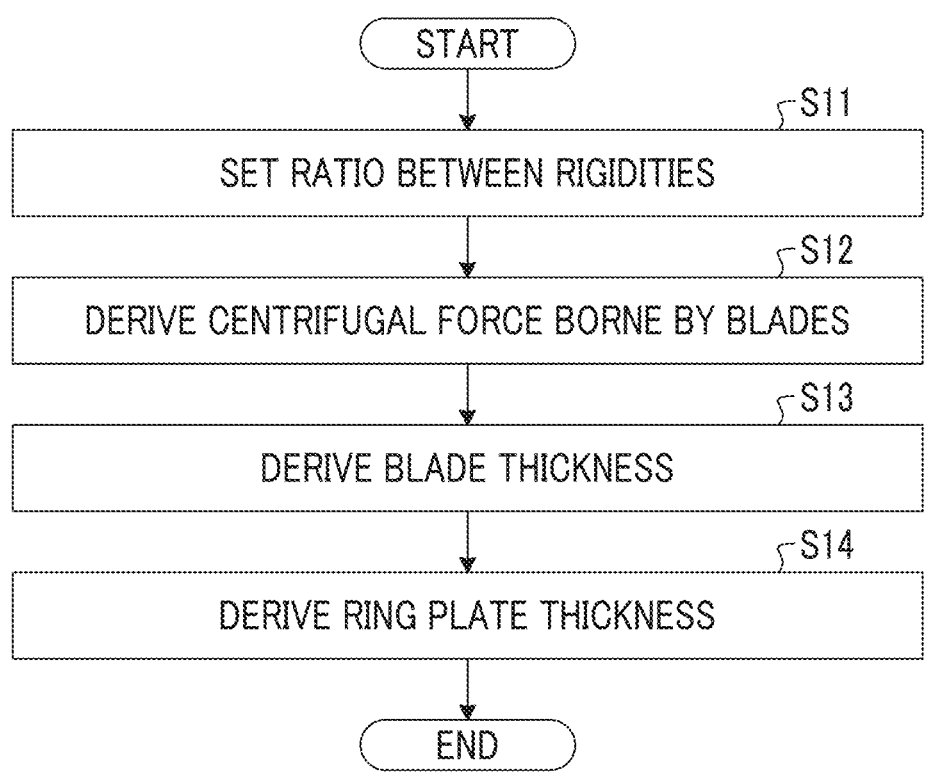
FIG. 6 is a flowchart related to a design method for the motor integrated type fan according to the present embodiment.

Here, a design method for a motor integrated type fluid machine for deriving the blade thickness and the ring plate thickness when drawing up the graph shown in FIG. 5 will be described. FIG. 6 is a flowchart related to a design method for a motor integrated type fan according to the present embodiment. As shown in FIG. 6, in this design method, first, step S11 in which the ratio of the rigidity of the rotating support ring 33 to the rigidity of the rotating portion 12 is set is performed. Next, step S12 in which the centrifugal force P1 borne by the blades 32 is derived is performed based on the ratio between the rigidities set as above. Thereafter, step S13 in which the thickness of the blades 32 is derived such that the blades 32 have a rigidity enough to withstand the derived centrifugal force P1 is performed. Then, step S14, in which the rigidity of the rotating support ring 33 is derived based on the rigidity of the blades 32 and the ratio of the rigidity of the rotating support ring 33 to the rigidity of the rotating portion 12 and the plate thickness of the rotating support ring 33 is derived such that the derived rigidity of the rotating support ring 33 is achieved, is performed. In this manner, the blade thickness and the ring plate thickness as shown in FIG. 5 are calculated.

In the present embodiment, the ratio of the rigidity of the rotating support ring 33 is set such that a plate thickness that is "the ring plate thickness+the blade thickness" is made equal to or smaller than a plate thickness T1, which is a predetermined threshold value. Here, the plate thickness T1 is a plate thickness determined by the weight of the rotating portion 12. The plate thickness is set to be equal to or smaller than T1 for suppression of the weight of the rotating portion 12. In this case, the ratio of the rigidity of the rotating support ring 33 to the rigidity of the rotating portion 12 is set to fall within a range H1 of 50% to 95%. In a case where the ratio of the rigidity of the rotating support ring 33 is in the range H1, the ratio of the rigidity of the plurality of blades 32 falls within a range of 5% to 50%. That is, in a case where the ratio of the rigidity of the rotating support ring 33 is 95%, the ratio of the rigidity of the plurality of blades 32 is 5% and in a case where the ratio of the rigidity of the rotating support ring 33 is 50%, the ratio of the rigidity of the plurality of blades 32 is 50%. In a case where the ratio between rigidities is set as described above, the rotating support ring 33 can efficiently bear a rigidity. More specifically, in a case where there is a decrease in ratio of the rigidity of the rotating support ring 33, the rigidity of the blades 32 is increased and the weight of the blades 32 is increased since the blades 32 need to bear a rigidity. For this reason, in order to suppress an increase in weight of the blades 32, the ratio of the rigidity of the rotating support ring 33 is made equal to or larger than 50%. Meanwhile, in a case where the ratio of the rigidity of the rotating support ring 33 is made excessively large for suppression of an increase in weight of the blades 32, the ring plate thickness of the rotating support ring 33 is made large, which results in an increase in weight of the rotating support ring 33. For this reason, in order to suppress an installation space for the rotating support ring 33 and an increase in weight of the rotating support ring 33, the ratio of the rigidity of the rotating support ring 33 is made equal to or smaller than 95%.

In addition, in the present embodiment, it is more preferable that the ratio of the rigidity of the rotating support ring 33 is set such that the plate thickness that is "the ring plate thickness+the blade thickness" is made equal to or smaller than a plate thickness T2 smaller than the plate thickness T1. Namely, in order to further suppress an installation space for the rotating portion 12 and an increase in weight of the rotating portion 12, the plate thickness is set to be equal to or smaller than T2. In this case, the ratio of the rigidity of the rotating support ring 33 to the rigidity of the rotating portion 12 is set to fall within a range H2 of 80% to 90%. In a case where the ratio of the rigidity of the rotating support ring 33 is in the range H2, the ratio of the rigidity of the plurality of blades 32 falls within a range of 10% to 20%. That is, in a case where the ratio of the rigidity of the rotating support ring 33 is 90%, the ratio of the rigidity of the plurality of blades 32 is 10% and in a case where the ratio of the rigidity of the rotating support ring 33 is 80%, the ratio of the rigidity of the plurality of blades 32 is 20%.

Further, in the present embodiment, it is more preferable that the ratio of the rigidity of the rotating support ring 33 is set such that the plate thickness that is "the ring plate thickness+the blade thickness" is minimized. Specifically, the ratio of the rigidity of the rotating support ring 33 to the rigidity of the rotating portion 12 is set to be 85% (point H3)±2%. In a case where the ratio of the rigidity of the rotating support ring 33 is 85%±2%, the ratio of the rigidity of the plurality of blades 32 is 15%±2%. Incidentally, 85%±2% has been used as the ratio of the rigidity of the rotating support ring 33 at which "the ring plate thickness+the blade thickness" is minimized since the ratio of the rigidity at which "the ring plate thickness+the blade thickness" is minimized differs slightly depending on the configurations, the sizes, and the materials of components and may not be 85%.

As described above, according to the present embodiment, the ratio of the rigidity of the rotating support ring 33 to the rigidity of the rotating portion 12 can be set to fall within the above-described range H1. Accordingly, it is possible to secure a load capacity against the tensile force P2 acting on the plurality of blades 32 even in a case where the centrifugal force P1 is applied and to secure a load capacity against the hoop stress P3 acting on the rotating support ring 33 while making the plate thickness that is "the ring plate thickness+the blade thickness" equal to or smaller than the plate thickness T1. Therefore, it is possible to suitably secure the load capacity of the rotating portion 12 against the centrifugal force P1 while suppressing an increase in weight of the rotating portion 12.

In addition, according to the present embodiment, it is possible to make the plate thickness that is "the ring plate thickness+the blade thickness" smaller by setting the ratio of the rigidity of the rotating support ring 33 to the rigidity of the rotating portion 12 to fall within the above-described range H2. Therefore, it is possible to reduce the weight of the rotating portion 12.

In addition, according to the present embodiment, it is possible to minimize the range of the plate thickness that is "the ring plate thickness+the blade thickness" by setting the ratio of the rigidity of the rotating support ring 33 to the rigidity of the rotating portion 12 to be the above-described point H3±2%. Therefore, it is possible to minimize the weight of the rotating portion 12.

In addition, according to the present embodiment, the ratio of the rigidity of the plurality of blades 32 can be made equal to or larger than 5% and equal to or smaller than 50% in accordance with the ratio of the rigidity of the rotating support ring 33. For this reason, the ratio of the rigidity of the plurality of blades 32 can be made appropriate for the ratio of the rigidity of the rotating support ring 33. Accordingly, it is possible to make the thickness of the blades 32 appropriate for the thickness of the rotating support ring 33 in the radial direction and thus it is possible to suppress an increase in weight of the blades 32 and to suppress the blade thickness. Therefore, it is possible to increase the degree of freedom in designing the weight and the thickness of the blades 32.

In addition, according to the present embodiment, the thickness of the rotating support ring 33 in the radial direction can be made smaller than the sum of the thicknesses of the plurality of blades 32. Therefore, it is possible to suppress an increase in weight of the rotating support ring 33.

In addition, according to the present embodiment, it is possible to provide a vertical take-off and landing aircraft in which the motor integrated type fan 1 having a high durability and having a load capacity against the centrifugal force P1 is mounted in an airframe.

The motor integrated type fluid machine (motor integrated type fan) 1 and the vertical take-off and landing aircraft described in each embodiment are grasped as follows, for example.

The motor integrated type fluid machine 1 according to a first aspect is the motor integrated type fluid machine 1 that suctions a fluid (air) from the suction port 38 and discharges the suctioned fluid from the discharge outlet 39, the machine including: the shaft portion 11 that is provided at the center of the rotation axis; the rotating portion 12 that rotates around the shaft portion 11; the outer peripheral portion (duct) 13 that is provided on an outer periphery of the shaft portion 11; and the motor 14 that rotates the rotating portion. The motor 14 is the outer peripheral drive motor 14 that applies power from the outer peripheral portion 13 to rotate the rotating portion 12, the rotating portion 12 includes the hub 31 that is rotatably supported by the shaft portion 11, the plurality of blades 32 that are provided on an outer peripheral side of the hub 31 and provided side by side in the circumferential direction of the rotation axis, and the rotating outer peripheral portion (rotating support ring) 33 that is provided on an outer peripheral side of the plurality of blades 32 and has an annular shape along the circumferential direction of the rotation axis, the motor 14 includes the rotor side magnet (permanent magnet) 45 that is provided in the rotating outer peripheral portion 33, and the stator side magnet (coil) 46 that is provided in the outer peripheral portion 13 to face the rotor side magnet 45, and the ratio of the rigidity of the rotating outer peripheral portion 33 to the rigidity of the rotating portion 12 is equal to or larger than 50% and equal to or smaller than 95%.

According to this configuration, the ratio of the rigidity of the rotating outer peripheral portion 33 to the rigidity of the rotating portion 12 is set to be equal to or larger than 50% and equal to or smaller than 95%. Therefore, it is possible to secure a load capacity against the tensile force P2 acting on the plurality of blades 32 even in a case where the centrifugal force P1 is applied and to secure a load capacity against the hoop stress P3 acting on the rotating outer peripheral portion 33. At this time, the thickness of the rotating outer peripheral portion 33 in the radial direction and the thickness of the plurality of blades 32 can be restrained from being large. Therefore, it is possible to suitably secure the load capacity of the rotating portion 12 against the centrifugal force P1 while suppressing an increase in weight of the rotating portion 12.

In the motor integrated type fluid machine 1 according to a second aspect, the ratio of the rigidity of the rotating outer peripheral portion 33 to the rigidity of the rotating portion 12 is equal to or larger than 80% and equal to or smaller than 90%.

According to this configuration, the sum of the thickness of the rotating outer peripheral portion 33 in the radial direction and the thickness of the plurality of blades 32 can be made smaller. Therefore, it is possible to reduce the weight of the rotating portion 12.

In the motor integrated type fluid machine according to a third aspect, the ratio of the rigidity of the rotating outer peripheral portion 33 to the rigidity of the rotating portion 12 is 85%±2%.

According to this configuration, it is possible to minimize the range of the sum of the thickness of the rotating outer peripheral portion 33 in the radial direction and the thickness of the plurality of blades 32. Therefore, it is possible to minimize the weight of the rotating portion 12.

In the motor integrated type fluid machine according to a fourth aspect, the ratio of the rigidity of the plurality of blades 32 to the rigidity of the rotating portion 12 is equal to or larger than 5% and equal to or smaller than 50%.

According to this configuration, the ratio of the rigidity of the plurality of blades 32 can be made appropriate for the ratio of the rigidity of the rotating outer peripheral portion 33. Accordingly, it is possible to make the thickness of the blades 32 appropriate for the thickness of the rotating outer peripheral portion 33 in the radial direction and thus it is possible to suppress an increase in weight of the blades 32.

In the motor integrated type fluid machine according to a fifth aspect, the plate thickness of the rotating outer peripheral portion 33 in the radial direction of the rotation axis is smaller than the sum of the thicknesses of the plurality of blades 32.

According to this configuration, it is possible to suppress an increase in weight of the rotating support ring 33.

A vertical take-off and landing aircraft a sixth aspect includes the motor integrated type fluid machine 1 described above and an airframe that is moved by thrust generated from the motor integrated type fluid machine 1.

According to this configuration, it is possible to provide a vertical take-off and landing aircraft in which the motor integrated type fluid machine 1 having a high durability and having a load capacity against the centrifugal force P1 is mounted in the airframe.

A design method for a motor integrated type fluid machine according to a seventh aspect includes step S11 of setting the ratio of the rigidity of the rotating outer peripheral portion 33 to the rigidity of the rotating portion 12, step S12 of deriving the centrifugal force P1 borne by the plurality of blades 32 based on the ratio between the rigidities, step S13 of deriving the thickness of the blades 32 based on the centrifugal force P1 such that the rigidity of the blades 32, at which the blades 32 withstand the derived centrifugal force P1, is achieved, and step S14 of deriving the rigidity of the rotating outer peripheral portion 33 based on the ratio between the rigidities and the rigidity of the blades 32 and deriving the plate thickness of the rotating outer peripheral portion 33 such that the derived rigidity of the rotating outer peripheral portion 33 is achieved.

According to this configuration, the rigidity of the blades 32 based on the ratio of the rigidity of the rotating outer peripheral portion 33 to the rigidity of the rotating portion 12 can be achieved. For this reason, it is possible to design the weight of the blades 32 and the blade thickness such that the rigidity of the blades 32 is satisfied and thus it is possible to increase the degree of freedom in designing the blades 32.

REFERENCE SIGNS LIST

1 Motor integrated type fan
11 Shaft portion
12 Rotating portion
13 Duct
14 Motor
15 Rolling bearing 16 Guide vane
31 Hub
32 Blade
33 Rotating support ring
38 Suction port
39 Discharge outlet
41 Fan blade rotor
42 Joining fitting
45 Permanent magnet
46 Coil
51 Restraining portion

The invention claimed is:

1. A motor integrated type fluid machine that suctions a fluid from a suction port and discharges the suctioned fluid from a discharge outlet, the machine comprising:
   a shaft portion that is provided at a center of a rotation axis;
   a rotating portion that rotates around the shaft portion;
   an outer peripheral portion that is provided on an outer periphery of the shaft portion; and
   a motor that rotates the rotating portion,
   wherein the motor is an outer peripheral drive motor that applies power from the outer peripheral portion to rotate the rotating portion,
   the rotating portion includes
      a hub that is rotatably supported by the shaft portion,
      a plurality of blades that are provided on an outer peripheral side of the hub and provided side by side in a circumferential direction of the rotation axis, and
      a rotating outer peripheral portion that is provided on an outer peripheral side of the plurality of blades and has an annular shape along the circumferential direction of the rotation axis,
   the motor includes
      a rotor side magnet that is provided in the rotating outer peripheral portion, and
      a stator side magnet that is provided in the outer peripheral portion to face the rotor side magnet, and
   a ratio of a rigidity of the rotating outer peripheral portion against a centrifugal force to a rigidity of an entire rotating portion, which includes the hub, the plurality of blades, and the rotating outer peripheral portion, against the centrifugal force is equal to or larger than 50% and equal to or smaller than 95%,
   wherein the rotating portion is a fan blade in which the rotor-side magnet of the motor is integrated, and the fan blade rotor includes:
      the rotating portion,
      the rotor-side magnet, and
      the restraining portion which integrally restrains the rotating outer peripheral portion of the rotating portion and the rotor-side magnet,
   wherein the restraining portion is wound around the rotating outer peripheral portion and the rotor-side magnet, with the rotating outer peripheral portion and the rotor-side magnet extending in a circumferential direction as a core.

2. The motor integrated type fluid machine according to claim 1,
   wherein the ratio of the rigidity of the rotating outer peripheral portion to the rigidity of the entire rotating portion is equal to or larger than 80% and equal to or smaller than 90%.

3. The motor integrated type fluid machine according to claim 2,
   wherein the ratio of the rigidity of the rotating outer peripheral portion to the rigidity of the entire rotating portion is 85%+2%.

4. The motor integrated type fluid machine according to claim 1,
   wherein a ratio of a rigidity of the plurality of blades to the rigidity of the entire rotating portion is equal to or larger than 5% and equal to or smaller than 50%.

5. The motor integrated type fluid machine according to claim 1,
   wherein a plate thickness of the rotating outer peripheral portion in a radial direction of the rotation axis is smaller than a sum of thicknesses of the plurality of blades.

6. A vertical take-off and landing aircraft comprising:
   the motor integrated type fluid machine according to claim 1; and
   an airframe that is moved by thrust generated from the motor integrated type fluid machine.

7. A design method for the motor integrated type fluid machine according to claim 1, the method comprising:
   setting the ratio of the rigidity of the rotating outer peripheral portion to the rigidity of the entire rotating portion such that a combined thickness of the rotating outer peripheral portion and the blade thickness is made equal to or smaller than a predetermined threshold;
   deriving a centrifugal force borne by the plurality of blades based on the ratio between the rigidities;
   deriving a thickness of the blades based on the derived centrifugal force such that a rigidity of the blades, at which the blades withstand the derived centrifugal force, is achieved; and
   deriving the rigidity of the rotating outer peripheral portion based on the ratio between the rigidities and the rigidity of the blades and deriving a plate thickness of the rotating outer peripheral portion such that the derived rigidity of the rotating outer peripheral portion is achieved.

* * * * *